(12) United States Patent  
Waterton et al.

(10) Patent No.: US 11,526,575 B2
(45) Date of Patent: Dec. 13, 2022

(54) WEB BROWSER WITH ENHANCED HISTORY CLASSIFICATION

(71) Applicant: INTERNATIONAL BUSINESS MACHINES CORPORATION, Armonk, NY (US)

(72) Inventors: Thomas James Waterton, Southampton (GB); Caroline J. Thomas, Eastleigh (GB); James Hewitt, Eastleigh (GB); Richard Jacks, Fareham (GB)

(73) Assignee: International Business Machines Corporation, Armonk, NY (US)

( * ) Notice: Subject to any disclaimer, the term of this patent is extended or adjusted under 35 U.S.C. 154(b) by 89 days.

(21) Appl. No.: 16/941,831

(22) Filed: Jul. 29, 2020

(65) Prior Publication Data

US 2022/0035886 A1    Feb. 3, 2022

(51) Int. Cl.
*G06F 16/957* (2019.01)
*G06F 16/955* (2019.01)

(52) U.S. Cl.
CPC ...... *G06F 16/9574* (2019.01); *G06F 16/9558* (2019.01); *G06F 16/9566* (2019.01); *G06F 16/9577* (2019.01)

(58) Field of Classification Search
CPC .......................................... G06F 16/954–9577
See application file for complete search history.

(56) References Cited

U.S. PATENT DOCUMENTS 6,275,862 B1    8/2001  Sharma
8,255,280 B1 *  8/2012  Kay ........................ G06F 9/54
                                                                        705/26.1
2009/0240686 A1 *  9/2009  Murali ................. G06F 16/955
2010/0131871 A1    5/2010  Hussain
2016/0162591 A1 *  6/2016  Dokania ............. G06F 3/04842
                                                                           707/738

(Continued)

FOREIGN PATENT DOCUMENTS

CN    102750352 A    10/2012

OTHER PUBLICATIONS http://www.cortical.io/extract-keywords.html, "Extract Keywords", cortical.io, Accessed on Apr. 23, 2020, 4 pages.

(Continued)

*Primary Examiner* — Robert W Beausoliel, Jr.
*Assistant Examiner* — Nirav K Khakhar
(74) *Attorney, Agent, or Firm* — L. Jeffrey Kelly

(57) ABSTRACT

An add-on for, or additional functionality integrated in, a web browser of the kind that logs visited web pages in history with their URL, HTML page title and a date/time stamp is provided. The history may additionally logs category tags and their confidence scores. The category tags may originate at least in part by extracting them from visited page content and may also propagate through from previously visited pages, for example when a page is opened by hyperlink from another page, the latter's category tags propagate through to the new page. The page-specific confidence scores may be determined by applying a scoring formula that mimics a user's mental association between a category tag and a web page. The category tags and their confidence scores may be then stored in the history log entry and the category tags may then be used to search the history.

20 Claims, 10 Drawing Sheets

(56) References Cited

U.S. PATENT DOCUMENTS

2017/0212962 A1 7/2017 Choi
2018/0260491 A1 9/2018 Gururaj
2020/0192951 A1* 6/2020 Singhal .............. G06F 16/9535

OTHER PUBLICATIONS

Kumbhat, "Create an Artificial Intelligence Bookmark Organizer for the Chrome Browser",https://developer.ibm.com/tutorials/smart-bookmark-plugin-using-watson . . . , Mar. 21, 2019, pp. 1-4.
Mell et al., "The NIST Definition of Cloud Computing", Recommendations of the National Institute of Standards and Technology, Special Publication 800-145, Sep. 2011, 7 pages.

* cited by examiner

WEB BROWSER WITH ENHANCED HISTORY CLASSIFICATION

BACKGROUND

The present disclosure relates to web browsers and in particular to improvements in the classification of web browser history logs to facilitate retrieval of previously visited web pages.

Web browsers are used to browse the Internet, or an organization's Intranet, on a computing device such as a personal computer, smartphone or tablet. For navigation, a standard web browser provides an address bar, a forward button, a back button and a home button. The basic design of web browsers has remained largely unchanged for several years. A typical web browsing session begins at a search engine home page where the user enters a search term for a desired topic. Once the results are returned, the user navigates through the results, selects one of them and then views a sequence of web pages following links embedded in the web pages.

A web browser may run on an operating system for a personal computer, such as Microsoft Windows or Apple Mac OS, or an operating system for a smartphone, such as Android or Apple iOS. Microsoft and Windows are trademarks of Microsoft Corporation of Redmond, Wash., United States of America. Apple, Mac and macOS are trademarks of Apple Inc., of Cupertino, Calif., United States of America. Android is a trademark of Google LLC of Mountain View Calif., United States of America. iOS is a trademark of Cisco Systems, Inc. of San Jose, Calif., United States of America which is licensed to Apple Inc. for use as the name of Apple's operating system of the same name.

A normal user may use a web browser to access hundreds or even thousands of different online resources every week. Amongst the many URLs (Uniform Resource Locators) visited, there will often be a few that the user will want to return to at a later point in time. This explosion in quantity and type of online resource that people access can make the storing and retrieval of particular online resource time-consuming and cumbersome—with many users complaining about struggling to find resources they have seen or used previously.

Traditional web browsers offer two ways to find previously visited web pages; bookmarks and history.

Web browser bookmarks provide a basic method of identifying and saving links to useful web resources. However, they have a number of limitations. The onus is on the user to remember to create the bookmark in the first place. The process of adding bookmarks is also time consuming in that the user has to manually type a descriptive name and then select or create a suitably named folder for the bookmark. The user has to think of a way to describe and categorize the online resource in such a way that they will hopefully be able to find it again amongst their other bookmarks in the future. Moreover, bookmarking is based on a one-to-one model of associating a URL with a bookmark folder.

Web browser history is a log of every web page that has been visited which can be searched by page title and URL and filtered by time. Nevertheless, it is still often laborious to find a previously visited page among the extremely large number of visited pages that may be recorded, which may run into the thousands or tens of thousands.

Various enhancements of these two basic facilities have been proposed over the years.

For example, automatic categorization of bookmarks in a web browser is described in U.S. 62/75,862B1. A method is disclosed by which, for each newly visited web page, the web browser compares properties of the new web page with properties of other already-bookmarked web pages.

Methods are also known that identify and tag visits in a web browser by identifying keywords associated with a URL resource (including being able to associate a plethora of keywords with a single URL) and which enable a user to search back through their browser history and use the keywords to refine the search results such as the following. US20180260491A1 identifies and tags visits in a web browser through identifying keywords associated with a URL resource. US20100131871A1 categorizes web pages into pre-defined profiles through keyword analysis. CN102750352A stores keywords for web pages by examining the pages for keywords.

It has also been proposed to use Artificial Intelligence (AI) to create a bookmark organizer in the tutorial "Create an artificial intelligence bookmark organizer for the Chrome browser" authored by Gaurav Kumbhat and published on 21 Mar. 2019 on the IBM developer platform at:

https://developer.ibm.com/tutorials/smart-bookmark-pl-ugin-using-watson-n1u/

According to this tutorial, an AI bookmark organizer is created that automatically scans a web page and uses natural language understanding from IBM Watson to attempt to place that bookmarked URL into a suitably named directory structure. This shows that computers can parse web content and that AI algorithms can be used to draw out likely semantic meaning from the parsed content. However, this approach still requires the user to manually initiate the bookmarking process and still relies on a one-to-one model of associating a URL with a bookmark folder.

SUMMARY

According to one aspect of the disclosure, there is provided a web browser operable to present web pages to a user and to navigate between web pages by following hyperlinks. The web browser comprises a conventional history generator configured to write a log entry for each visited web page to a history log, each log entry comprising metadata including: the visited web page's URL, the visited web page's HTML page title, and a date and time stamp of when the web page was visited. The conventional history generator is augmented so as to log additional metadata for visited web pages, the additional metadata comprising category tags and a confidence score for each category tag. The additional metadata is generated by a web page analyzer configured to analyze a currently visited web page to identify text terms of significance for the currently visited web page in combination with a category tag generator configured to select a set of category tags for the currently visited web page from candidate category tags including the text terms of significance found by the web page analyzer. When the currently visited web page was opened via a hyperlink from another web page, the category tags of the linking web page are also included as candidate category tags. The category tag selection from among the candidates is carried out by applying a scoring formula to obtain confidence scores for the candidate category tags. The category tags with the highest scores are selected. The scoring formula is configured to mimic a user's mental association between a category tag and a web page. The selected category tags and their confidence scores are saved into the log entry for the current web page visit. To make use of the additional metadata, the web browser is provided with a user interface via which a user is able to perform a category tag search of the history log in order to locate and open previously visited web pages.

The additional metadata logging to log the category tags and their confidence scores and the user interface to enable category-tag based searching may be delivered as an add-on to a standard web browser or integrated in the standard version of a web browser. However, to emphasize which features are non-standard, we generally refer to an add-on when referring to extra features that are not present in conventional browser. In the case of delivering the additional functionality with an add-on, the add-on may be offered separately, e.g. by a third-party vendor. Since the web browser may be an integral part of the device's operating system, the disclosure also relates to an operating system comprising a web browser as described above, e.g. a web browser as installed in a mobile computing device as part of its operating system. The web browser may be a mobile browser for a mobile computing device, such as a smartphone or tablet, or a browser designed for a conventional personal computer, for example.

The user interface allows for searching of the history log based on category tags entered by the user and delivers as a search result a filtered selection of log entries, from which a URL may be selected, thereby to open the corresponding web page.

The enhanced functionality provided by the category tags is compatible with web browsers of the kind that support browsing sessions with multiple simultaneously open browsing tabs. In this case, the set of candidate category tags may be extended to further include category tags from web pages of other open tabs.

The scoring formula in certain embodiments has a factor for candidate category tags that originate from other web pages based on similarity between the currently visited web page and the other web page. The similarity factor may include whether the category tags of the other web page are also identified by the web page analyzer as text terms of significance.

The web browser may be of the kind that supports a system of bookmarks in which a user is able to store the URLs of web pages selected by the user in a folder structure with a page name that is definable by the user and a folder that has a folder name that is definable by the user. In this case, the category tag generator may be configured to check if the currently visited web page is bookmarked and if so to adopt at least one of its page name and its folder name as a candidate category tag. The bookmarking system of a standard browser will typically cater for a hierarchical folder structure. In this case, the category tag generator may be configured to adopt also folder names of any superordinate folders for bookmarked web pages as candidate category tags. For more effective integration with a user's bookmarks, the additional metadata may usefully further comprise an indicator of whether the web page is bookmarked.

The add-on may further provide the web browser with a history log editor to allow a user to manually edit the history log. In this way, a user can add a user defined category tag to a given web page's history log entry. Using a history log editor, the user can also manually edit the history log to mark a category tag of a given web page's history log entry as not being representative of the user's mental association with that web page, which may be thought of as a kind of deletion function, but one which persistently records the fact that the category tag was negatively assessed by the user.

Inclusion of a category tag from another web page in the set of candidate category tags, i.e. its importation, can be made conditional on obtaining user input to confirm that the user associates the category tag from the other web page with the currently visited web page. This may be used selectively, e.g. for candidates with borderline scores, or for certain kinds of category tags only, e.g. ones that originated with a manually addition by the user.

The add-on may also provide the web browser with a history log updater configured to amend the additional metadata stored in the history log responsive to the user's interaction with the web browser. The additional metadata may for example be amended responsive to analysis of the user's use of category tags in searches made by the user interface such that the confidence score of a category tag in a history entry is increased when that history entry is used to access a web page via use of that category tag in a search by the user interface. The additional metadata may also further include a category tag specific relevance parameter whose value is set responsive to a history entry being used to access a web page via use of that category tag in the user interface.

A relevance filter with a de minimis threshold may be included whereby the add-on is configured to store additional metadata conditional on the currently visited web page being visited for an amount of time greater than a threshold value.

The user input to the user interface may take place in a variety of different ways as is known in the art, for example one or more of: touch input to a touchscreen interface; speech input to an audio interface; cursor motion in, or a cursor-linked button input to, a graphical user interface; and page scrolling in a graphical user interface.

According to another aspect of the disclosure, there is provided an add-on for a web browser of the kind that is operable to present web pages to a user and to navigate between web pages by following hyperlinks and which has a history generator configured to write a log entry for each visited web page to a history log, each log entry comprising metadata including: the visited web page's URL, the visited web page's HTML page title, and a date and time stamp of when the web page was visited, wherein the add-on augments the history generator by logging additional metadata for visited web pages, the additional metadata comprising category tags and a confidence score for each category tag. The additional metadata is generated by a web page analyzer configured to analyze a currently visited web page to identify text terms of significance for the currently visited web page in combination with a category tag generator configured to select a set of category tags for the currently visited web page from candidate category tags including the text terms of significance found by the web page analyzer and, when the currently visited web page was opened via a hyperlink from another web page, the category tags of the linking web page, wherein the selection is carried out by applying a scoring formula to obtain confidence scores for the candidate category tags and by selecting as category tags those with the highest scores, the scoring formula being configured to mimic a user's mental association between a category tag and a web page. The add-on further provides the web browser with a user interface via which a user is able to perform a category tag search of the history log in order to locate and open previously visited web pages.

Another aspect of the disclosure provides a computing device loaded with the above-defined web browser. A still further aspect of the disclosure provides a computer readable medium on which is stored the above-defined add-on so as to be loadable into internal memory of a computing device.

A yet further aspect of the disclosure provides a computer program product storing the add-on.

According to another aspect of the disclosure, there is provided a method of supplying the above-defined add-on to a web browser, the method comprising: providing a website from which the add-on may be downloaded to a third party computing device on request; and causing the add-on to be sent via a network connection to the computing device in response to such a request together with an installer for integrating the add-on with a web browser installed on the computing device.

According to another aspect of the disclosure, there is provided a method of operating a browsing session with a web browser, the web browser being operable to present web pages to a user and to navigate between web pages by following hyperlinks, the method comprising:

opening a browsing session;

writing a log entry for each visited web page to a history log, each log entry comprising metadata including: the visited web page's URL, the visited web page's HTML page title, and a date and time stamp of when the web page was visited, category tags, and a confidence score for each category tag, the category tags and confidence scores being generated by:

analyzing the currently visited web page to identify text terms of significance for the currently visited web page; and selecting a set of category tags for the currently visited web page from candidate category tags including the text terms of significance found by the web page analyzer and, when the currently visited web page was opened via a hyperlink from another web page, the category tags of the linking web page, wherein the selection is carried out by applying a scoring formula to obtain confidence scores for the candidate category tags and by selecting as category tags those with the highest scores, the scoring formula being configured to mimic a user's mental association between a category tag and a web page.

Specific implementations of our proposed approach can deliver one or more of the following benefits. The web browser modified as proposed provides an alternative to bookmarks with a bookmark-like functionality, with the advantage that the user is not required to curate his or her own bookmark library in the conventional manner through manual entries into a bookmark list and folder structure. Although conventional bookmarking is not required, the web browser modified as proposed is compatible with and can take advantage of conventional bookmarks. Indeed, it can operate more powerfully when the user does also conventionally bookmark certain pages, while at the same time allowing a user who bookmarks to become much sparser in the number of pages that are bookmarked.

The category tags (and their page-specific confidence scores) can also be added after the event to log entries in the history by propagating backwards in time based on common combinations of category tags, thereby allowing current browsing session activity to be applied to make it easier to find web pages that are in history from previous browsing sessions, even previous browsing sessions made with the browser before an extension or add-on according to the proposed method was added. The proposed way of storing web page history with the addition of category tag and confidence score metadata results in a single web page log entry in history being associated with, in general, multiple category tags. This allows a user to search history based on entering combinations of two or more category tags as a filter, thereby making it easier to find a previously visited page of interest than with a standard web browser.

The disclosure further relates to a computing device loaded with the above-mentioned web browser. The disclosure further relates to a computer readable medium on which is stored the above-described add-on, web browser or operating system, so as to be loadable into internal memory of a computing device. The disclosure further relates to a computer program product storing the above-described add-on, web browser or operating system.

Another aspect of the disclosure is a method of supplying the above-described add-on to a web browser. The web browser is of the kind that is operable to present web pages to a user, to navigate between web pages by following links, and to store browsing history. The method comprises: providing a website from which the add-on may be downloaded to a third-party computing device on request; and causing the add-on to be sent via a network connection to the computing device in response to such a request together with an installer for integrating the add-on with a web browser installed on the computing device.

BRIEF DESCRIPTION OF THE DRAWINGS

In the following, the present invention will further be described by way of example only with reference to exemplary embodiments illustrated in the figures.

DETAILED DESCRIPTION

In the following detailed description, for purposes of explanation and not limitation, specific details are set forth in order to provide a better understanding of the present disclosure. It will be apparent to one skilled in the art that the present disclosure may be practiced in other embodiments that depart from these specific details.

Before describing details of the web browser design according to embodiments of the disclosure, we describe first an example personal computing device able to host a web browser according to embodiments of the disclosure and also a mobile or tablet device able to host a web browser according to embodiments of the disclosure. A web browser has the function of presenting web pages to a user and allowing the user to navigate between web pages by following links embedded in the web pages. This activity is referred to as web browsing.

Figure 1:
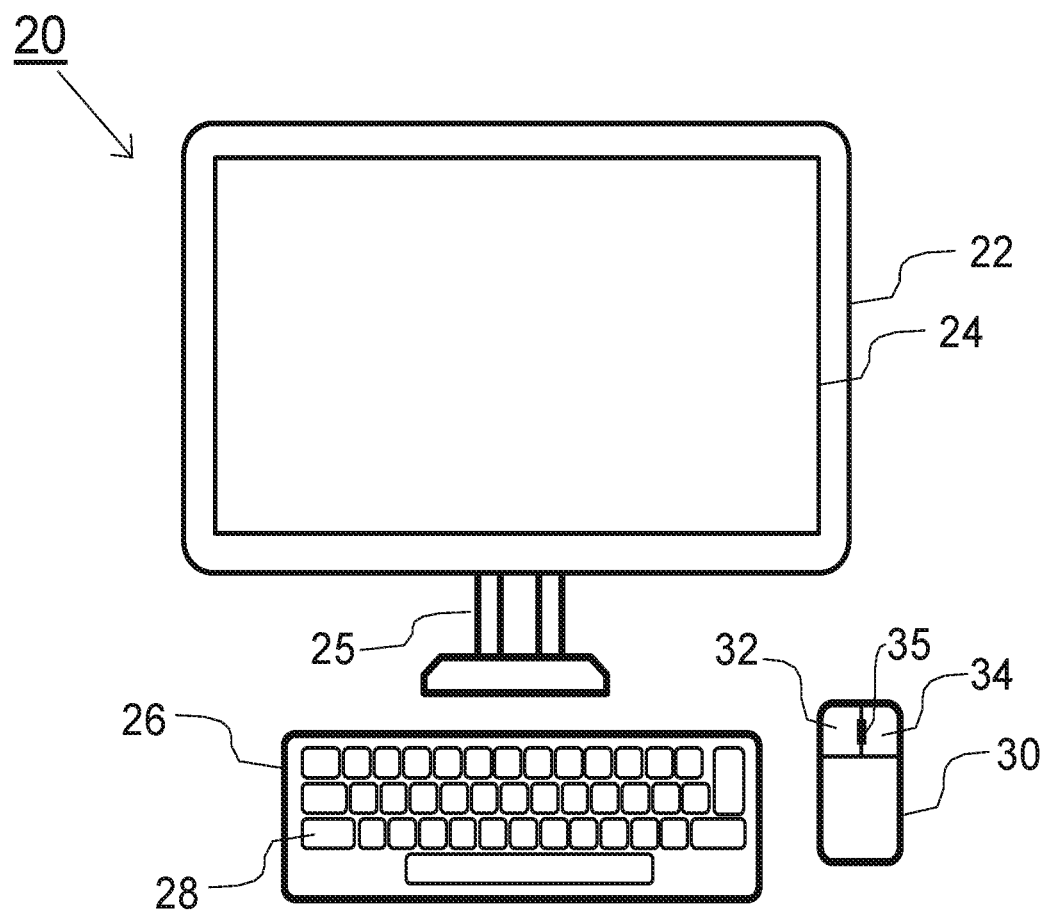
FIG. 1 shows a generic personal computing device on which a web browser according to embodiments of the disclosure may be installed and run.

FIG. 1 shows a generic computing device 20 on which a web browser according to embodiments of the disclosure may be installed and run. The computing device 20 comprises a monitor 22 housing a display 24 and having a stand 25. The computing device 20 further comprises suitable user input/output (I/O) devices with a keyboard 26 and mouse 30 being illustrated. In the case that the display 24 includes an overlaid touch sensor, then the touch sensor will constitute a further I/O device. The keyboard 26 includes a plurality of keys 28, e.g. following a standard QWERTY layout and space bar, with other standard keys such as ENTER, CAPS LOCK, ALT, CTRL, FN and so forth also being provided. The mouse 30 is illustrated as including a left button 32, a right button 34 and a scroll wheel 35. Input from the mouse 30 is used to control the position of a cursor on the display 24 and thus forms part of the graphical user interface (GUI), so that cursor motion may be used to place the cursor over a button icon or other GUI control presented on the display, and then actuation of one of the mouse buttons 32, 34 when the cursor is positioned over such a button icon may be interpreted as pressing the button, thereby providing a cursor-linked button input to the GUI. Further buttons and input elements may of course also be included, such as in a mouse designed or configured for gaming or other specific application types.

Figure 2:
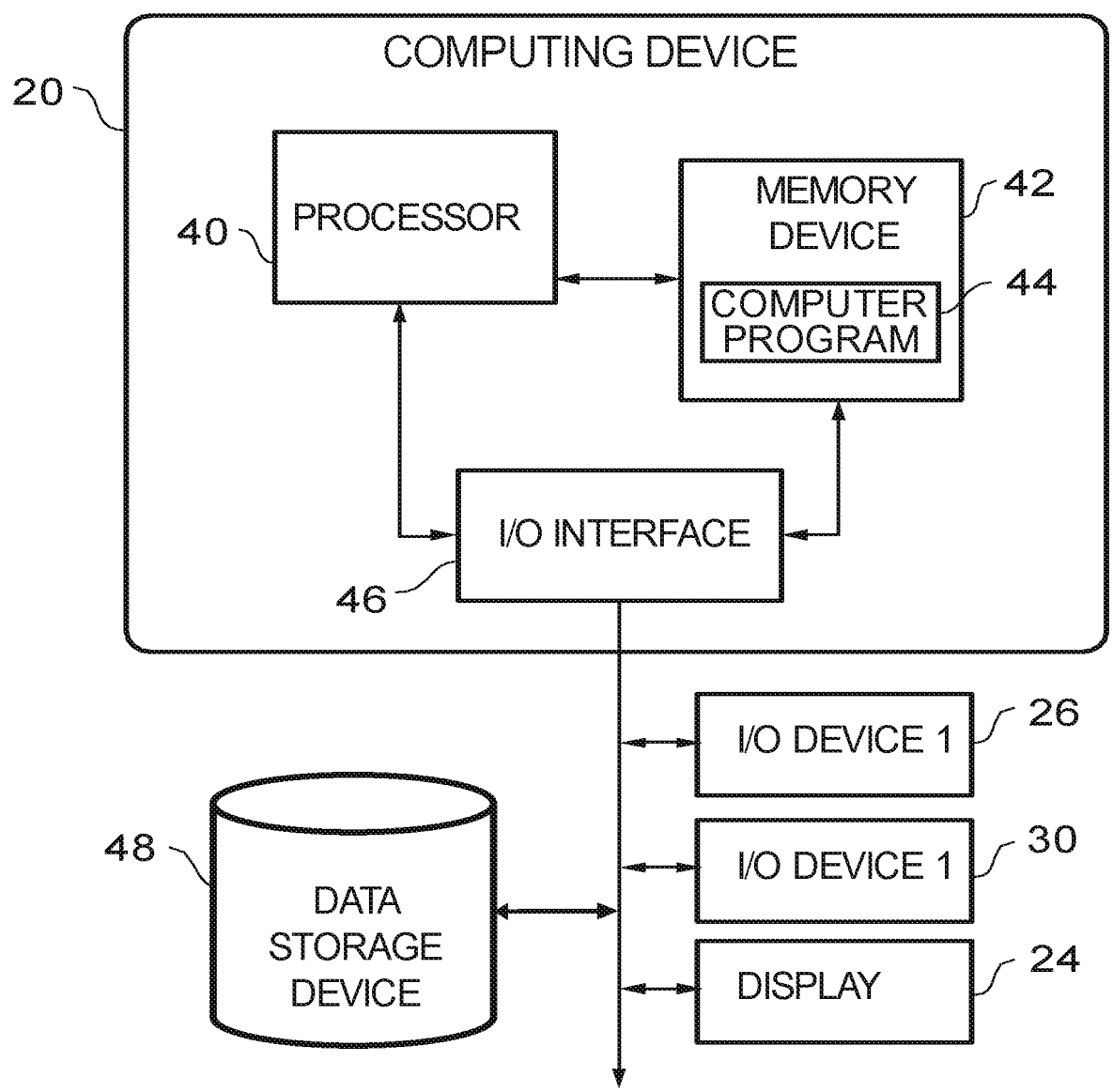
FIG. 2 shows internal structure of the generic personal computing device of FIG. 1.

FIG. 2 shows internal structure of the generic computing device 20 of FIG. 1 in a block diagram. The computing device 20 comprises a processor 40 to provide a processor resource coupled through one or more I/O interfaces 46 to one or more hardware data storage devices 48 and one or more I/O devices 26, 30, which can manage graphic object requests, and the display 24 on which graphics objects can be displayed. The processor 40 may also be connected to one or more memory devices 42. At least one memory device 42 to provide a memory resource contains one or more stored computer programs 44, each computer program comprising a set of computer-executable instructions. An example computer program is a web browser. The data storage devices 48 may store the computer program 44. The computer program 44 stored in the storage devices 48 is configured to be executed by processor 40 via the memory devices 42. The processor 40 executes the stored computer program 44.

It will be clear to one of ordinary skill in the art that all or part of the logical process steps of the preferred embodiment may be alternatively embodied in a logic apparatus, or a plurality of logic apparatus, comprising logic elements arranged to perform the logical process steps of the method and that such logic elements may comprise hardware components, firmware components or a combination thereof.

It will be equally clear to one of skill in the art that all or part of the logic components of the preferred embodiment may be alternatively embodied in logic apparatus comprising logic elements to perform the steps of the method, and that such logic elements may comprise components such as logic gates in, for example, a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In a further alternative embodiment, the present invention may be realized in the form of a computer implemented method of deploying a service comprising steps of deploying computer program operable to, when deployed into a computer infrastructure and executed thereon, cause the computing device to perform all the steps of the method.

It will be appreciated that the method and components of the preferred embodiment may alternatively be embodied fully or partially in a parallel computing system comprising two or more processors for executing parallel software.

A further embodiment of the invention is a computer program product defined in terms of a system and method. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 3A:
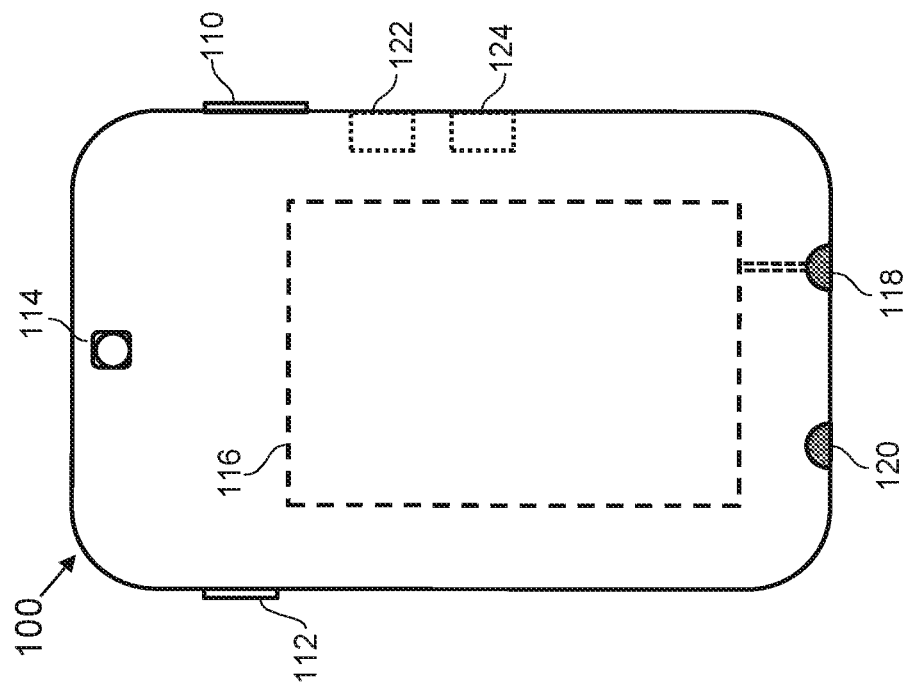
FIG. 3A is a schematic view of the front of a handheld touchscreen computing device.
Figure 3B:
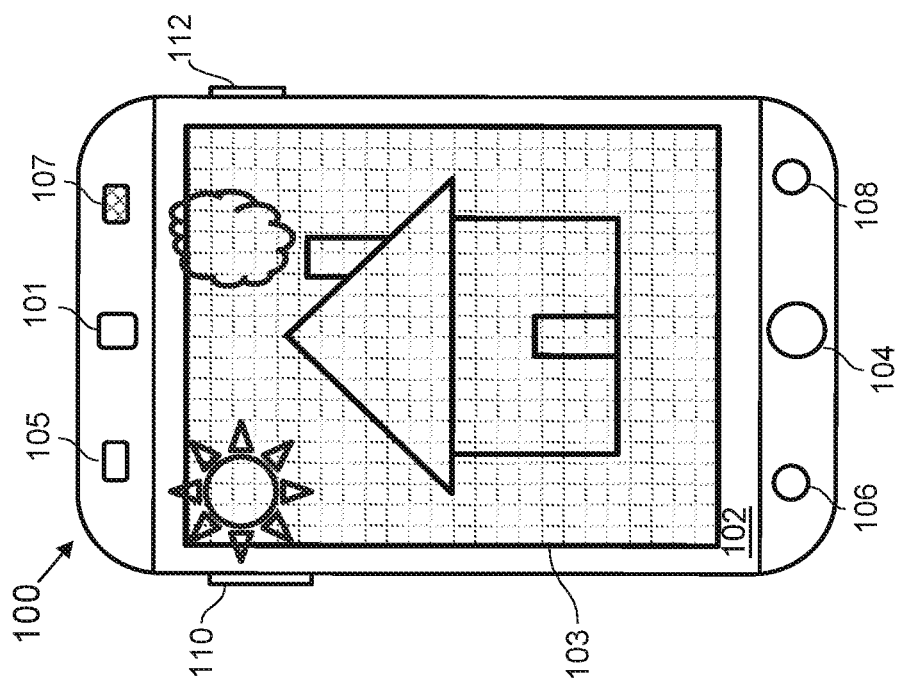
FIG. 3B is a schematic view of the rear of the handheld touchscreen computing device of FIG. 3A.

FIG. 3A and FIG. 3B are schematic perspective views from the front and behind of a handheld touchscreen computing device, such as a mobile phone or tablet, on which a web browser according to embodiments of the disclosure may be installed and run.

Figure 4:
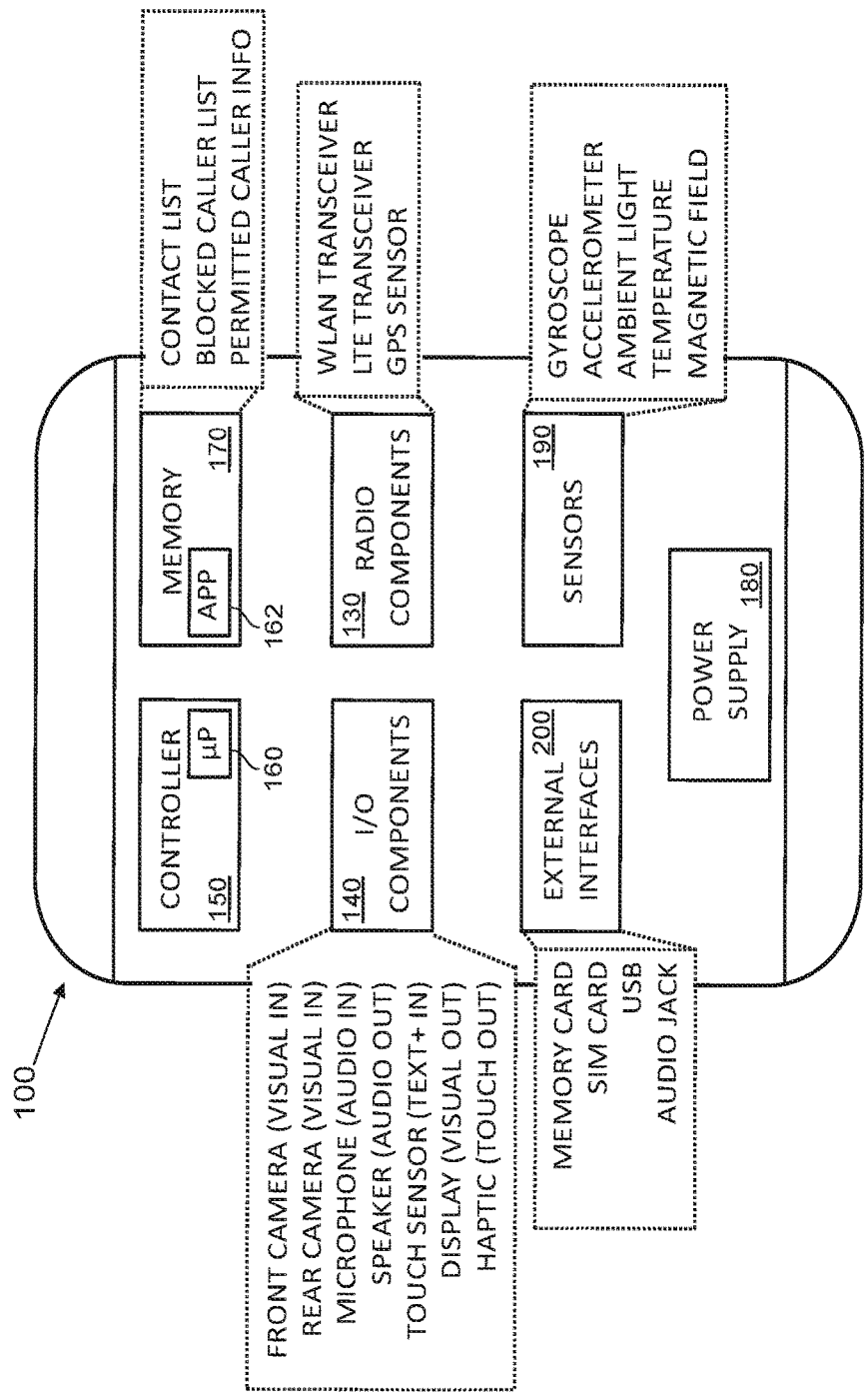
FIG. 4 is a block diagram of the functional components of the handheld touchscreen computing device of FIG. 3A and FIG. 3B.

FIG. 4 is a block diagram of the functional components of the computing device of FIG. 3A and FIG. 3B.

Referring to FIG. 3A, the computing device 100 has a smartphone or tablet format. The computing device 100 is arranged in a housing with a front face (facing outwards from FIG. 3A), a rear face and a bezel forming the edges of a substantially rectilinear object. The front face is mostly taken up with a touch screen display which combines a display 102 (shown displaying a scene with house, smoke and sun) with a touch sensitive area 103 (shown with the hatching). The touchscreen enables the user to input commands to applications running on the computing device through gestures, which vary from the humble single touch of a point on the display to select it, referred to in the art as a tap, and other single touch gestures, such as a swipe, through to multitouch gestures such as the two-finger pinch conventionally used for zooming in and out and rotating. We note that in this document references to gestures means touch gestures on a touchscreen. The front face also accommodates a mechanical key (or button) 104 and two touch sensor keys (or buttons) 106, 108, one either side of the mechanical key 104. The edges of the housing accommodate a mechanical rocker switch 110 for volume control and an on/off switch 112. There is also a haptic layer embedded in the touch screen 102 to provide tactile feedback (not shown).

A front facing camera 101 for capturing stills or video images is arranged on the front face near the top of the housing facing forwards and has adjacent to it a microphone 105 for capturing audio and a speaker 107 for outputting audio.

Referring to FIG. 3B, the rear view, a rear facing camera 114 for capturing stills or video images is arranged near the top of the housing facing backwards. A battery 116 is accommodated within the housing and constitutes a power supply (shown with dashed lines). The power supply further includes an external power input socket 118 which may be used for powering the device as well as charging the battery. Alongside the power input socket 118 at the bottom of the device there is another external connector in the form of an audio jack 120 for audio output. Further external interfaces may be provided including various ports, holders and sockets for physical connections. With dotted lines we show two internal holders 122, 124 which may be for a SIM card and a memory card or further SIM card. The memory card is a kind of data storage device.

Referring to FIG. 4, this shows selected functional components of the computing device 100. The computing device 100 has radio components 130, input/output (I/O) components 140, a controller 150 associated with a processor 160 and a memory 170, a power supply 180, sensor components 190 and external interfaces 200. The memory 170 is operable to store computer programs, typically referred to as computer applications ('apps' for short) 162. Each computer program comprises software code portions that are loadable into and executable by the processor 160. An example computer program is a web browser.

The memory 170 has various memory portions. There is a memory portion for storing a contact list which is a data structure storing the user's known contacts which may be accessible and editable via a database app. There is a memory portion for storing a blocked caller list, which is a data structure storing telephone numbers or other caller identifiers which the user has logged as blocked callers, which may be accessible and editable via an app. There is also a further memory portion in which the user can store descriptions, descriptors or characteristics of calls or types of call which the user wishes to permit, i.e. not block, even if they are not known contacts, these descriptions being accessible and editable via a database app.

The processor 160 may comprise separate processing units for specialist tasks such as video processing, speech/audio analysis and/or speech/audio synthesis, e.g. with the aid of natural language processing. The controller and associated processor have the task of controlling the computing device and executing computer programs stored in the memory. The memory may store computer applications for running on the computing device as well as collecting data from the various I/O devices. The controller typically functions to control overall operation of the computing device, in addition to the operations associated with the application programs. The controller processes signals, data, information and the like input or output through the above-mentioned components and/or runs application programs saved in the memory, thereby processing or providing a user with appropriate information and/or functions. The mobile device 100 is further operable to use its processor 160 to apply filtering to decide whether or not to generate a call alert responsive to detecting an incoming call.

The radio components 130 includes a WLAN transceiver, an LTE transceiver, and a GPS module. The I/O components 140 include a display capable of displaying content and also acting as part of a GUI, wherein the display may be based on a suitable technology such as liquid crystal or organic light emitting diodes, as well as a position-sensitive touch sensor area overlaid on, or formed as an integral part of, the display to serve as part of a GUI in conjunction with the display with optionally other touch sensor areas or buttons (e.g. on the reverse side or edge (bezel) of the device housing. Further I/O components, as previously mentioned, are front and rear facing cameras for capturing stills or video images, a microphone for capturing audio such as speech, a speaker for outputting audio and a haptic output embedded in the touch screen to provide tactile feedback. The sensing components include a gyroscope, an accelerometer, an ambient light sensor and a temperature sensor, for example. The external interfaces may include various ports and sockets for physical connections, such as a SIM card, wired LAN connectors, memory cards, audio jack socket, USB ports and so forth.

The mobile device 100 is operable to use one of its I/O components 140 as an input device, e.g. for audio or text, to allow a user to input a description of a permitted caller. The mobile device 100 is further operable to use one or more of its I/O components 140 as an output device to generate a call alert, e.g. an audio output for sounding a ring tone, or a haptic output to cause the mobile device, or a part thereof, to vibrate.

Figure 5:
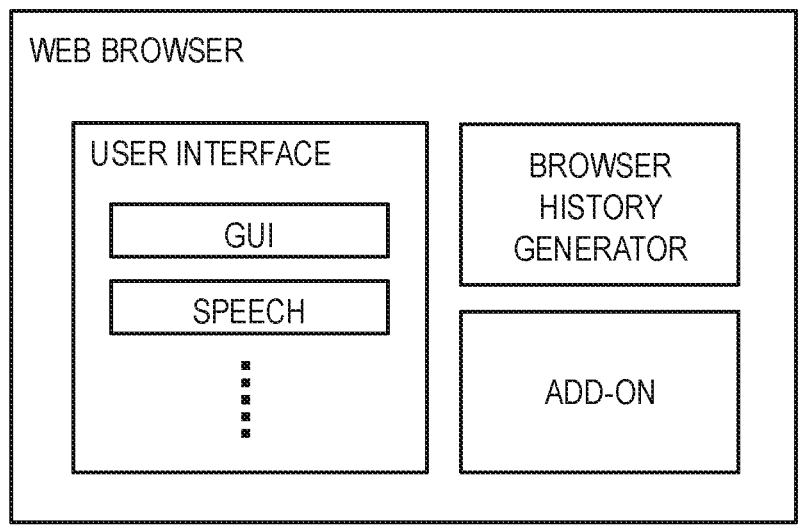
FIG. 5 shows components of a generic web browser including add-ons.

FIG. 5 shows components of a generic web browser with an add-on, which may be an add-on according to embodiments of the disclosure. The web browser includes, or has access to input from and output to, a user interface which in turn may have distinct elements. The user interface may comprise a GUI (typically via a touch screen in a mobile device or a mouse or touchpad and display in a personal computer). The user interface may comprise a speech recognition user interface, sometimes referred to as a virtual assistant (e.g. Apple Siri, Samsung Bixby, Microsoft Cortana, or Google Assistant). Other user interfaces and user interface elements may be provided. The web browser has a history generator that has the role of writing metadata for visited web pages to a history log which is a chronological list of the web pages that have been presented. In a standard web browser, the metadata for each visited web page includes: the visited web page's URL, the visited web page's HTML page title, and a date and time stamp of when the web page was visited. In some cases, the favicon icon is also included as part of the history log's metadata. The browsing history of a web browser is usually accessible to a user via a "history" tab. The web browser optionally has one or more add-ons. Historically browser add-ons were provided as plug-ins, but latterly browser add-ons are provided as extensions. Typically, a plug-in is an executable, whereas an extension is source code. A browser add-on is a software module for customizing the web browser. Web browsers typically allow a variety of extensions, including user interface modifications, ad blocking, and cookie management. Web browsers are released with an application programming interface (API) to allow developers to write add-ons for the web browser.

Figure 6:
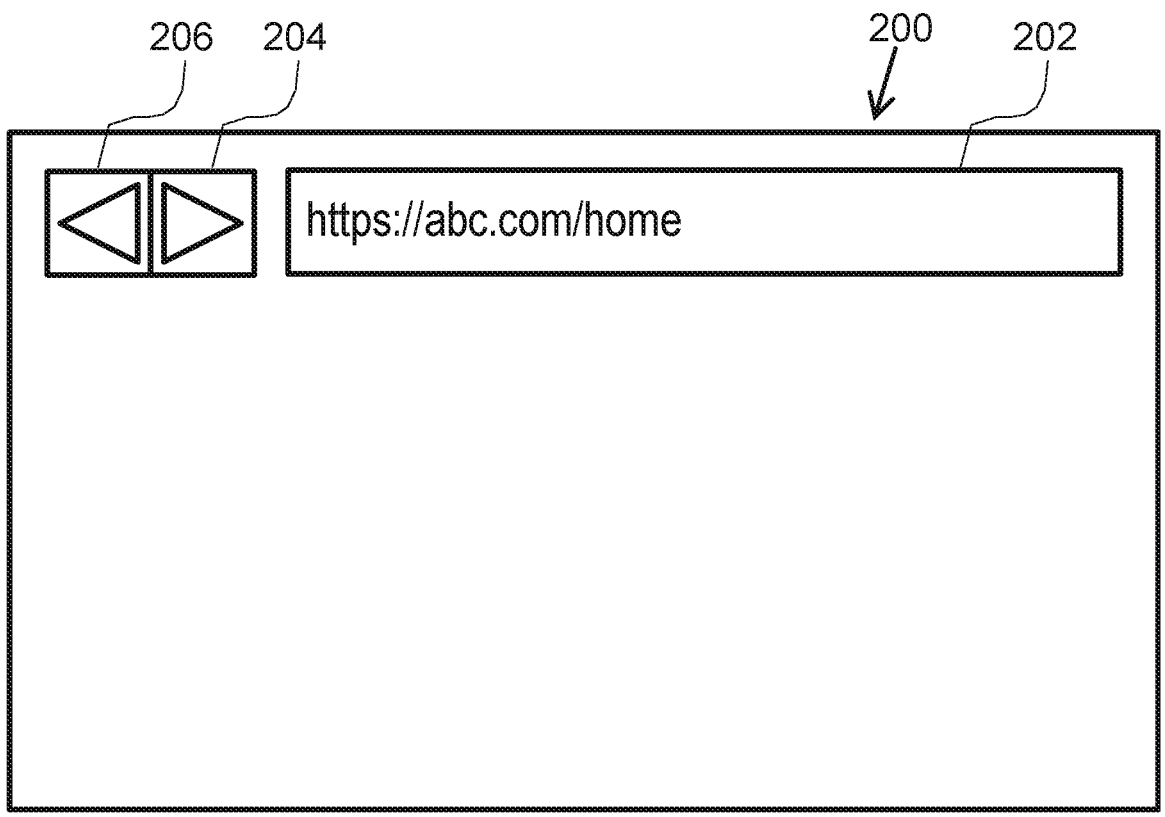
FIG. 6 shows features of a graphical user interface of a web browser.

FIG. 6 shows a GUI 200 of a generic web browser. The web browser GUI 200 includes an address bar 202, a forward icon 204 and a back icon 206 that are used as GUI control buttons to assist a user's navigation between web pages when browsing with reference to the browsing history. The browsing history of the web browser is a record of the web pages that have previously been presented by the web browser. Actuation of the back icon 206 is associated with a back command that is used to move backwards through the browsing history of the web browser to present the most recent previously presented web page. The forward icon 204 is associated with a forward command that is used to advance forward in a browsing history of the web browser, and first becomes active after a user has jumped backwards in the browsing history through actuation of the back command. The address bar 202 allows a user to enter in text a web address, e.g. unique resource locator (URL), of a desired web page. Embodiments of the present disclosure provide a web browser add-on to a standard web browser.

Figure 7:
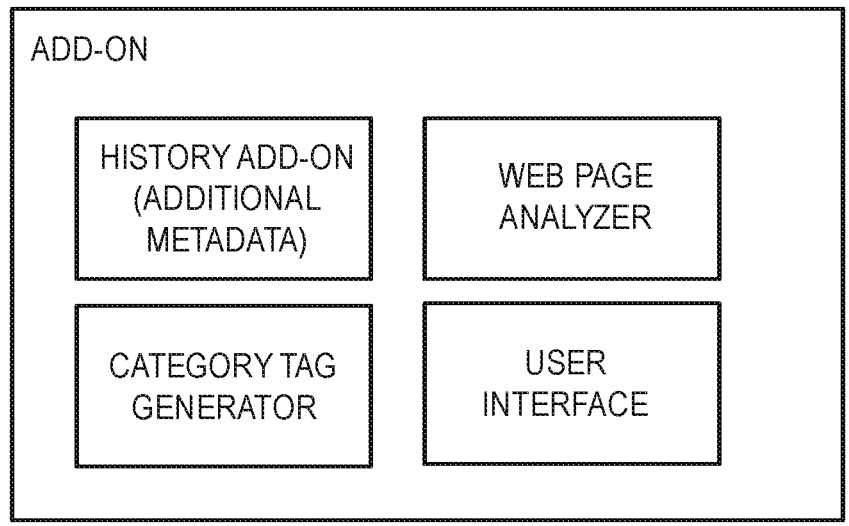
FIG. 7 shows components of a web browser add-on according to embodiments of the disclosure.

FIG. 7 shows components of an add-on according to embodiments of the disclosure. The add-on comprises a history add-on which augments the browser's standard history generator by providing the extra functionality of logging additional metadata for visited web pages. As described in detail further below, the additional metadata comprises category tags and a confidence score for each category tag. The additional metadata is generated by a web page analyzer. The web page analyzer is configured to scrape the currently visited web page to identify terms that are of significance for the web page, where the terms may be text terms of individual words or phrases. How this can be implemented in practice is described in detail further below. The add-on further comprises a category tag generator configured to select a set of category tags for the currently visited web page from candidate category tags. The candidates include the terms of significance found by the web page analyzer. The candidates also may include category tags from previously visited web pages. Specifically, if the currently visited web page was opened via a hyperlink from another web page, then the category tags of the linking web page are adopted as candidates. Category tags from other web pages, e.g. other web pages that are currently open in other tabs, or other web pages that have only recently been opened or closed. The selection from among the candidates is carried out by applying a scoring formula to obtain confidence score for each of the candidates. The selection is then made by selecting those with the highest scores. The scoring formula is configured to mimic a user's mental association between a category tag and a web page, so that it should return a high (low) value when it is deemed likely (unlikely) that the web page relates to the category tag. The purpose of the additional metadata is to enable a user interface tool to find web pages of interest in the history. For this purpose, the add-on further comprises a user interface via which a user is able to perform a category-tag-based search of the history log in order to locate and open previously visited web pages. For example, when the user opens a new browser tab, this may include the user interface, via which the user can enter search terms that are thought to be category tags or be presented with stored category tags to select. This is described in more detail further below.

Figure 8:
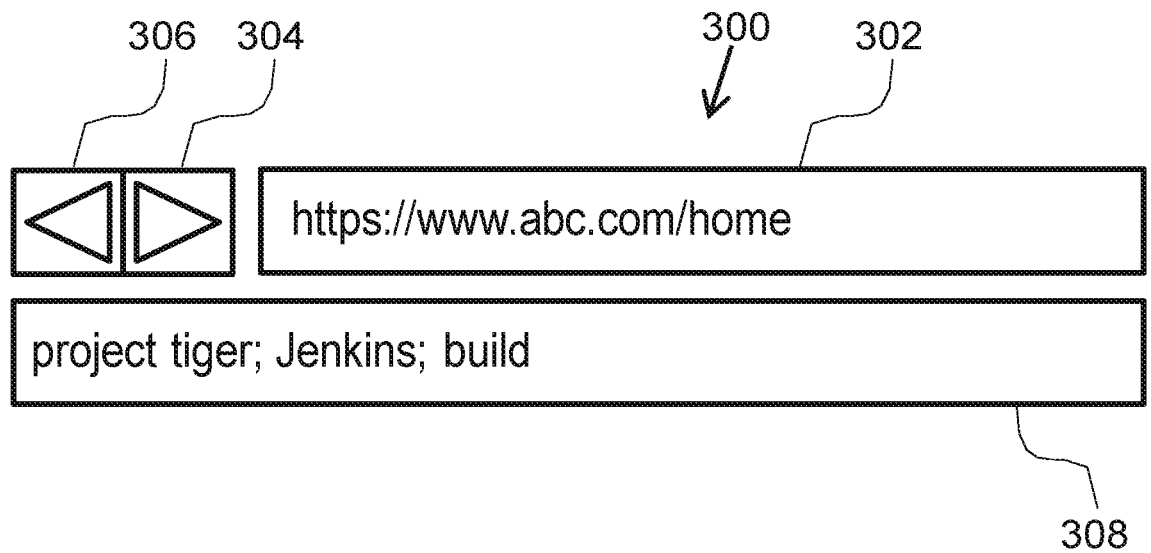
FIG. 8 shows a graphical user interface of a web browser with the add-on of FIG. 7.

FIG. 8 shows features of a GUI 300 of a web browser with the add-on of FIG. 7. The web browser GUI 300 includes an address bar 302, a forward icon 304 and a back icon 306 which are from the standard browser and not associated with the add-on. The add-on provides a category tag search user interface 308 which the user can use to add search terms for a category tag search. In the illustration, by way of example three search terms are entered "project tiger; Jenkins; build" for an example user search trying to retrieve previously visited web pages relating to a project with the internal name Tiger about build automation.

When a page (URL) is visited, the web browser acts to identify terms associated with the web page. These terms have the role of being candidate category tags. The terms may be extracted by content scraping the web page: e.g. using http://www.cortical.io/extract-keywords.html. The web page may be inspected with special reference to key metadata (e.g. text within HTML <title> or <caption> or <a href> elements). The number of identified terms in any given web page could be quite high, e.g. 20+. The web browser then calculates an estimated confidence score for each term for the web page, based on factors such as number of occurrences of the term in the page (or a synonym), semantic position within the page. The terms with the highest confidence scores for that page are then adopted as category tags. These category tags are saved for the page in the metadata for the page, as stored in the browser history.

The maximum number of category tags to be stored per web page may usefully be capped, where the cap is envisaged to be set at a relatively small number, e.g. between one and eight. As well as imposing a cap on the maximum number of category tags to be stored per web page, a confidence score threshold may also be applied, so that a term is only stored as a category tag, if it has an above-threshold confidence score. In this way the stored category tags should be limited to those that are likely to be relevant to the user. As well as storing the category tags, the web browser also stores the confidence scores for the category tags.

The metadata in the browser history for each page may also log whether the page is (or was at the time of visit) bookmarked. This could be done with a Boolean present in every web page's metadata, or by adding a special category tag to identify bookmarked pages. If the metadata does not store whether a page is bookmarked, then of course the same information can be determined when running a search of the history with reference to the current bookmark store.

In summary of the above detailed description, the following data is part of the history metadata of a conventional web browser:

URL
HTML page title
date and time stamp
and optionally also the favicon icon (and also assuming the page has one).

Then, according to our method, the following data would be added as further metadata to the browsing history data store for each web page that is visited:

Category tag(s) associated with the page
Confidence score for each of the category tags in the web page.

In addition, the further metadata may include other entries, for example the above-mentioned Boolean or other indicator of whether the page is/was bookmarked. Further possible metadata entries are discussed in the following, so it will be understood that the above is a non-exhaustive list of metadata that may be included.

The user may also be provided with a facility to manually add category tags to a given web page. We refer to a manually added category tag as a custom category tag. Such tags may be useful to represent information that isn't available or deducible on the page. One example would be the name of a project that the user is working on, which has occasioned visiting the web page. Another example would be to mark web pages that are being visited as part of the user organizing a specific holiday or business trip, or for preparing for a certain examination. Once a custom category tag has been added to a certain web page, it can then propagate through to other web pages based on the trail concept discussed further above, where the propagation need not just be forward propagation, but may also be back propagation.

The user may also be provided with a facility to manually mark a category tag in a given web page as not being representative of the user's mental association with that web page. Suppose a page includes a custom category tag that has propagated automatically from another page, and the user does not associate that page with this category tag, then the user is able to "delete" that tag from the history entry. To prevent the same category tag later being re-added to the page by an automatic process performed by the web browser, the action is not one of removal, but rather a persistent recording of the negative input. One way of implementing this would be that user "deletion" of a category tag marks the category tag as not being associated with that page to express the user's manual input that the category tag is not representative of the user's associations with that web page. By way of example, if based on some of the propagation methods mentioned above a certain page became tagged with "Project Tiger" but to the user that page was not related to "Project Tiger" then the user can remove that particular tag from the URL history entry (regardless of and independent of the confidence score assigned). The user's manual input to express the category tag was not to be used would then be recorded in a persistent manner to avoid the user's express wish to ignore the category tag from being overridden (i.e. undone) by any future automatic processing that the system performs on that same URL history entry. The same negative marker on the category tag can also be read by the web browser and so used to suppress its onward propagation into any other URL history entries. The negative marker could be integrated into the confidence score, e.g. by assigning an out-of-range value, such as minus 1, assuming the confidence score is always in the positive range.

The proposed method monitors the trail followed by the user to generate an enhanced tagging across a group of web pages, which allows for category tags to permeate or propagate between log entries. The propagation may involve:

Using referrer information (how the user got to a given web page) to determine likely semantic tagging;
Using onward action information (where the user went to after visiting a given web page) to determine likely semantic tagging;

Using temporal association (what else they were doing around the same point in time) to determine likely semantic tagging; and/or The combination of using the multiple data points outlined to automatically determine likely semantic tags for all web pages visited (without the user needing to do anything)

The trail may be followed by following links, i.e. when a page is opened from another page via a hyperlink. This may be limited to linking that follows a user input via a user interface that activates the link, thereby filtering out following involuntary redirects, e.g. as caused by advertising, which may cause not just one but multiple new web pages to be opened. (This is a particular acute issue with mobile web browsers.)

The trail may also be generated by the web browser looking for similarities between web pages. If a user is browsing within a website, then all web pages will have addresses with a common stem. Similarity may also be deduced by parsing web page content to extract significant key words and comparing the key words extracted from the newly opened web page with the previously opened web page (or all currently open web pages in the browser session). The comparison may be a simple text comparison. The comparison may also be more sophisticated and include natural language processing which takes account of synonyms, content and so forth.

The extra associations created by trailing can improve how pages are linked to a user's perception of relevance and grouping of web pages with perhaps seemingly disparate subject matter. For example, if browsing for information relating to Kubernetes and you follow a link to a page on Prometheus monitoring, which works on Kubernetes but is not Kubernetes specific, your (the user's) context is still around Kubernetes, even though it may not be mentioned much (or at all) in the page. When searching browser history, it would be good if the Prometheus pages still come up under a search for Kubernetes, as that is what you need the monitoring for.

The trail may also be refined or established looking back in time to take account of the user's browsing history or other actions after the relevant page was opened. For example, if a given Web Page B was opened from a link in Web Page A and then quickly after (e.g. in less than 2 seconds) the user returned to Web Page A (e.g. by actuating the back button), then Web Page B can be deemed to be of no interest. On the other hand, the same sequence, but differing in that the user spends a lot of time on Web Page B and navigates back and forth between Web Page A and Web Page B multiple times would indicate the two web pages are strongly associated in the user's mind and both of significant interest.

A trail link between an old page and a new page may be made by temporal association with other resources. For example, if the user opens a new web page within a configurable amount of time (e.g. 30 seconds) of having opened another (old) web page that has category tags assigned, then those category tags are carried over into the set of category tags for the new page, or at least carried forward as candidate category tags from which the category tags are selected by the web browser. A temporal association may additionally require that the category tags in the old web page have some kind of positive approval by the user, e.g. the old page is bookmarked or the old page has come from a link or chain of links from a bookmarked page, or the category tag is one that was manually added by the user in the old page or some other page from which they were carried into the source page by the trail function.

A trail link may be made by based on referrer information. Namely, if the user arrived at a new web page (URL) by clicking a link on another (old) web page that is open in the browser (which has had category tags assigned to it), then those category tags are adopted as category tags for the new page, or at least as candidate category tags from which the category tags are selected.

A trail link may be conditional on user approval. Namely, if the web browser needs to decide whether to carry over category tags from an old web page to a new web page, it may in certain circumstances use a UI function to ask the user whether the old and new web pages (or the individual categories) are linked in the mind of the user. For example, when a user opens a new browser tab, a UI in the web browser may ask the user whether the new tab is a continuation of the same topic (without attempting to define what that topic is) and make the carrying over of the category tags conditional on an affirmative input from the user. Another option would be that when a user opens a new browser tab, the UI in the web browser asks the user whether the new tab is a continuation of the highest scored category tag in the old web page. If the old web page has "project tiger" as its highest scoring category tag, then the UI prompt would be "Is the new browser tab also for project tiger?" A still further option would be to perform natural language processing on the user's search term into the web browser for the new tab to obtain a semantic similarity score between the search term and either category tags in the old web page (or all open web pages) or between the search term and text or other content of the old web page. By contrast, if the user duplicates a web page, then it can be assumed this is a continuation of the same topic.

The scoring of terms within the trailing concept, and hence which terms are adopted as category tags for a given web page, can thus take account of parameters not used in established web browsers, such as: proximity in time to other resources the user was accessing; how the user arrived at the new web page; and where the user went from the web page.

Category tags based on bookmark folder names may operate in the same way to custom category tags, in that the web browser is configured to add the folder name as a category tag to all web pages stored in that folder. The folder name can then propagate from the bookmarked web pages in the named folder to other web pages through the trail concept.

The web browser may be configured to add further category tags to previously visited web pages stored in history. For example, if a user engages in a bookmark organization session by creating a new bookmark folder and moving several existing bookmarks into the new folder, then the name of the new bookmark folder can be added as a category tag to the metadata of these bookmarked web pages.

The web browser may also be configured to amend the text labels of category tags for web pages based on user input. For example, if a user stores a bookmark and manually changes the name from that given to it by the web site, then the former is stored as the category tab not the latter. Taking a concrete example, if the user visits the following web page:

https://www.ipo.gov.uk/p-ipsum.htm and adds it to bookmarks, it will be assigned the name given to it by the website itself, which is:

Intellectual Property Office—Patent document and information service (Ipsum)

The user may manually change the page name as, or after, it is bookmarked to something which more closely matches how the page is identified in the user's thoughts, e.g.:

UKIPO Patent Register

In this example, the web browser will use "UKIPO Patent Register" as the category tag, not the less memorable and less specific long name "Intellectual Property Office . . . .". Expanding this example, the folder name may be "Patent Office Registers" and the superordinate folder name "Patent Searching".

The web browser may also react to the user deleting bookmarks. If a web page is deleted from bookmarks, the web browser may be configured such that this action triggers it to find the deleted web page in history and delete its category tags and/or zero (or at least reduce) its confidence score. The former measure would prevent the web page from coming up in future category tag searches and the latter measure only would not prevent the web page being found in such a search but would reduce its ranking.

When the user wants to navigate to a previously visited web page, instead of having to search the bookmark folder structure for the relevant folder or sub-folder and bookmark contained therein, the browser is provided with a user interface (UI) to allow the user to select relevant category tags. The UI could be integrated into the browser so that it appears each time a new browser tab is opened. The UI includes a search field to allow the user to enter words and phrases in natural language. The search words entered by the user are then used as a basis to filter the browser history by searching the metadata stored with the browser history for each entry in particular the category tabs. The search results that match the filter can then be presented to the user in a ranked list based on their confidence scores and possibly other metadata, such as whether the page is bookmarked. Another way for the UI to permit a user to find previously visited web pages based on the stored metadata is to present category tabs to the user and allow the user to select individual category tabs to use as filters. When multiple category tabs are applied in a search, then the confidence scores need to be aggregated in some way in order to rank the hits. Any usual aggregation could be used, e.g. take the highest score only, multiply the scores together, add the scores together. In the case of three or more category tags in a search, then the ranking may be in tiers of the total number of matches, e.g. if the search combines four category tags, then tier the search results as 4/4 then 3/4 then 2/4 then 1/4. Within each tier, then the ranking could follow any of the previously mentioned aggregations.

The UI design may take various forms. In most implementations, the UI will at least allow free user input of search terms that the user knows (or thinks) are category tags. Instead or in addition, other UI features may be provided. The UI may provide a list of existing category tags for the user to select from. Instead of a list, the category tags could be presented as a visual tag cloud, with the size of the category tag text being in proportion to, for example, the sum of its confidence scores. For example, if a given category tag is stored with 'N' web page visits in history, each with a confidence score '$s_n$' where n=1 to N, then the size of the category tag text in the cloud could be $\Sigma_{n=1}^{N} s_n$.

The UI may also be configured to apply each category tag as a filter to the history as it is typed in (or otherwise selected) to improve interactivity. For example, when the user selects one category tag for searching on (e.g. "build"), a search could immediately return a list all of the URLs in history associated with this tag. The list may show, for example, the page title, favicon icon, and any other tags associated with that page. Note the user could also search for a previously visited page by selecting more than one tag (e.g. "build" and "Jenkins" and "project tiger") in which case, the search would first return those visited pages associated with all selected tags. A search option configurable by the user could be whether only to return web pages that match all of a plurality of searched category tags, which may potentially return no hits, or simply to return the best match, e.g. when 3 category tags are in the filter, then return URLs that have 2 out of the 3 category tags. These would be listed lower than the 3 out of the 3 hits, or perhaps only listed if there are no 3 out of 3 matches.

Using an example, if the user wanted to navigate to a useful web page they had found previously when working on a project related to build automation, they could open a new browser tab to prompt the UI to appear and then click on (or enter in text) the tags "build" and "Jenkins" and "project tiger". The UI would then filter the history to show only the history web pages containing those three tags (or if none, then 2 out of 3). If the user knows that a subject-related page is bookmarked, they can instead, or in addition, apply the bookmark as a filter, where the filter criterion is the set of category tags of the bookmarked page. The category tag "project tiger" may have been manually created by the user as a bookmark folder, and may have then propagated through to the metadata of the web pages stored in this bookmark folder, and to other web pages that the user visited via links in those web pages, and/or other web pages that the user visited in a common browsing session as when the bookmarked web pages in the folder "project tiger" were open.

Metadata may also be added, deleted or edited retrospectively in the browser history to take account of the user's browsing activity. Specifically, the category tags and their confidence scores may be changed over time to take into account feedback from the user's ongoing browsing and use of the category tags, as may be gleaned for example from the user's use of the UI and the user's browsing activity. For example, further metadata could be later added to web page entries already in the history, said further metadata relating to a user's subsequent utilization of category tags as navigation aids. The add-on may subsume this functionality in a history log updater configured to amend the additional metadata stored in the history log responsive to the user's interaction with the web browser.

If the user later bookmarks the same page, then the log of the previous visits to the same page in history could be augmented to note that the page is (now) bookmarked. Retrospective editing of the browser history also allows the importance of previously visited pages to be retrospectively raised, for example if a page is found from a history search using the UI via entry into the UI of one or more category tags associated with the page's log, then the confidence score for the category tag stored in history for that page could have its value increased. Another option would be to add a special metadata parameter value for logging that a URL has been retrieved from a category tag search using the UI. This parameter value would be specific to a category tag and form a measure of whether the category tag is, or has been, useful to the user, as measured by detecting if, or whenever, the user uses that category tag in a UI search to access the history entry. This parameter could be a counter to count how many times the web page has been re-accessed via a category tag. For example, each category tag stored in the history log of a web page would have a counter that is initially zeroed and which is incremented each time that category tag is used to retrieve the URL from that history entry. It could also be a simple binary parameter such as a flag that is set the first time a category tag is used in a UI search to access the page stored by the history entry.

Whether this further metadata is added to the history entry for a web page could be made additionally conditional on the user selecting, and thus navigating to, one of the hits from the results list (i.e. not just that it is a hit in a UI search).

The web browser may also be configured to learn from the user's feedback (e.g. whether the user amended or deleted automatically assigned tags or added their own tags) as a further measure to enhance the confidence rating of certain words, which in turn would help it increase its accuracy in future. For example, a machine learning (artificial intelligence) model, such as IBM Watson Machine Learning could be built, trained and used.

To enhance the effectiveness of the proposed method still further, the web browser may be additionally configured to assess whether a user found a visited web page to be of interest and to determine a level of interest using either a parameter with discrete levels or a scalar parameter with a continuous scale. The further metadata specific to the proposed method may not be saved at all for web pages decided to have been of no interest, or an additional metadata parameter may record that the web page was deemed not to have been of interest. For example, web pages presented for below a threshold amount of time may be deemed to be not of interest, and web pages presented for longer than the threshold may be given an interest level metadata tag, e.g. on a scale from 1 to some maximum value such as 3 or 5, based solely or in part on the amount of time spent on the page. Another option would be simply to have the time spent on the page recorded as the metadata interest tag. The perceived interest measure may also be based on receipt of user input to a user interface of the web browser during the time when the web page was presented. User input to the interface may be of any kind supported by the operating system. For example, user input to the user interface may be one or more of: touch input to a touchscreen interface; speech input to an audio interface; cursor motion in or a cursor-linked button input to a graphical user interface; or page scrolling in a graphical user interface. The measure may also be based on some measure of active interaction with the page, e.g. as determined from input from a camera that views the user. For example, the measure could be based on: face tracking of the user; blink counts of the user; and/or eye motion tracking of the user. Not adding category tags to web pages deemed to be of no interest (or setting their confidence scores to zero or other suppressed value) is useful to avoid a search finding web pages that have only been visited as a result of following involuntary redirects, e.g. as caused by advertising, which may cause not just one but multiple new web pages to be opened. This is a particularly acute problem for mobile web browsers (e.g. Android), but sometimes may also occur in PC browsers (e.g. Chrome).

We now describe a concrete example. A user navigates to a web page. The system scrapes the page to come up with likely semantic topics and stores these in memory as category tags:

a. Optionally, a configurable length is set for the scrape, so that the system only scans for example the first 'x' hundred words present in a page, where 'x' is a positive integer.

b. As part of the scrape, the process refers to a word bank of common terms to ignore (e.g. "a", "an", "and", etc.)

c. For each identified word or phrase (i.e. each word or phrase not found in the terms-to-ignore list) a count is done, and optionally.

d. Optionally, words or phrases with fewer than a threshold number of occurrences are ignored. The threshold could be user configurable.

e. Assign a score to all remaining words and phrases based on:

i. count (the more occurrences, the higher the score)

ii. position within the web page (e.g. an occurrence within a heading would count for more than an occurrence within body text based on a heavier weighting such as a certain multiple)

iii. inclusion within certain HTML elements (e.g. an occurrence within a <title> or <caption> or <a href> HTML element would count for more based on a heavier weighting such as a certain multiple).

If the user navigated to the current web page within a threshold amount of time (e.g. a few seconds) of browsing another page or pages, check the category tags for that page(s) and include those in the list of candidate category tags for the newly opened page.

If the user arrived at the current web page by clicking on a link from another web page, check the category tags on that other page and include those in the list of candidate category tags for the newly opened page.

If the user clicks a link from the current page to navigate to a new web page (but still has the original page open), check to see whether the new page has been visited previously (the web browser could be configured to check for this in history or at least for bookmarked pages), and if so, include the previously assigned category tags to the list of candidate category tags for the new page.

The user also has the ability to manually define custom tags—e.g. by a user interface control on the browser tab, which when clicked, would open a small dialog window where the user could type in a tag to add (e.g. "project tiger"), which would then be associated with the web page.

Category tags could also be added based on bookmark folder names (e.g. if there is a bookmark folder called "project tiger"). The folder name could be added to all web pages stored in this folder (optionally including sub-folders thereof). In other words, the log entry for visiting a bookmarked page stored in a bookmark sub-folder, would adopt as a category tag not only the folder name of the sub-folder where it is stored, but also the name of the superordinate folder, where this approach can be extended to any number of hierarchical levels.

Once the algorithm has finished populating the list of candidate category tags, a selection is made of which to retain in history. The selection is based on confidence score, the formula for which is intended to mimic how strongly the visit to the web page is linked in the mind of the user to the category tag. The selection is capped to a small maximum number—typically between 2 or 3 and 8, 9 or 10. In addition, the selection may apply a confidence score threshold which has to be exceeded in order to be selected. The selected tags with their confidence scores are then stored as metadata in the browser history record for that visit to the web page as well as the usual metadata. The scoring formula may have a factor for candidate category tags that are imported from other web pages based on similarity between the currently visited web page and the other web page, so that similar web pages are scored higher. The similarity factor may for example include whether the category tags stored in the log of the previously visited web page have also been identified by the web page analyzer as text terms of significance for the currently visited web page.

Figure 9:
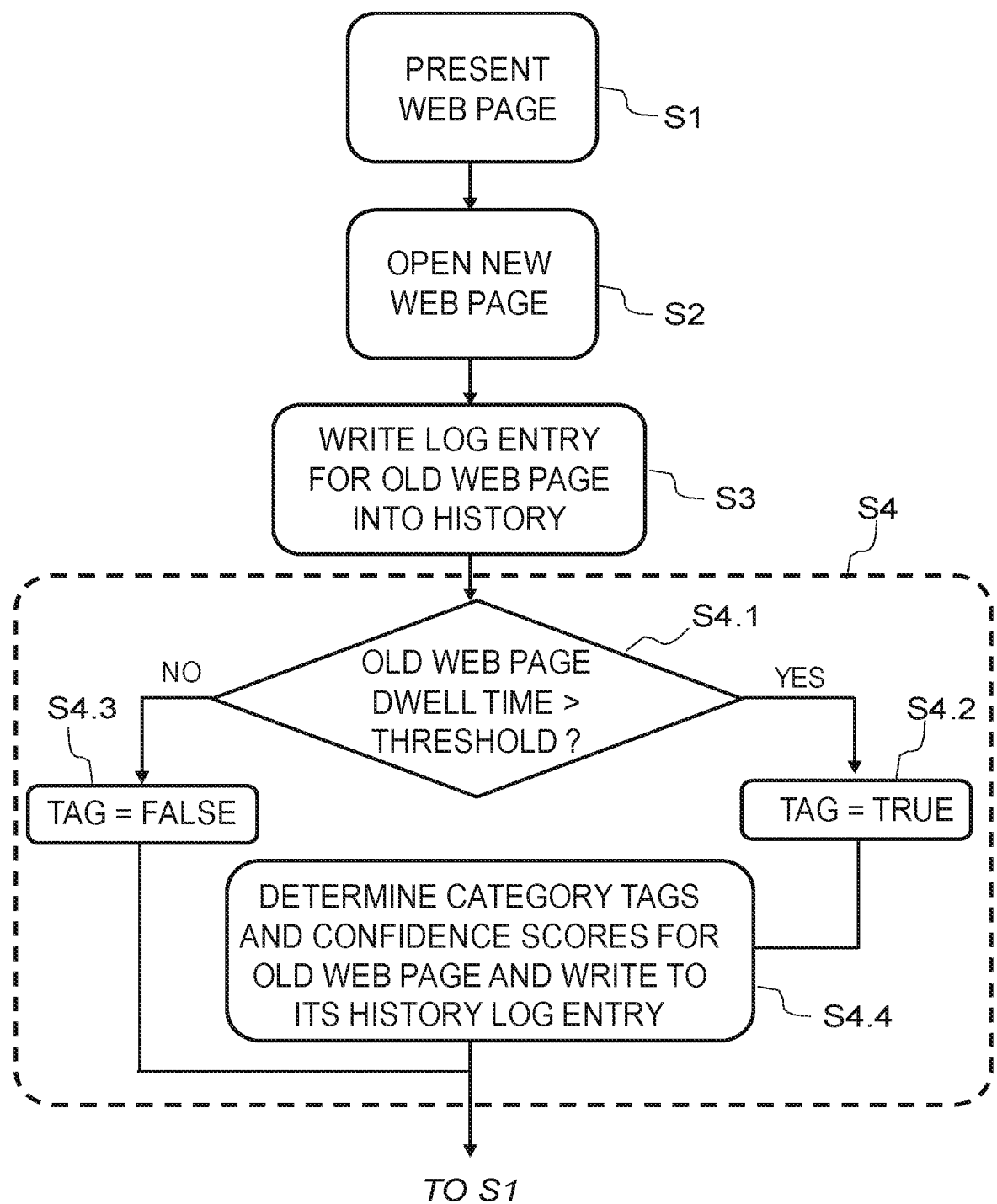
FIG. 9 is a flow diagram showing a method of operating a browsing session with a web browser according to embodiments of the disclosure.

FIG. 9 is a flow diagram showing a method of operating a browsing session with a web browser with the enhanced functionality described above. Initially, the user opens a browsing session. A first web page is presented in Step S1. A second web page is then opened in Step S2, which may be caused by the user selecting a hyperlink in the first web page, or the user opening a new browser tab, for example. The act of opening the second web page triggers the web browser to create a log entry for the first web page and write it to the history log. (Alternatively, generating a history log entry for the first page could be triggered by opening the first page.) The standard log entry for the first web page is created in Step S3, i.e. a log entry with the visited web page's URL, the visited web page's HTML page title, and a date and time stamp of when the web page was visited. In Step S4, we see that in Steps S4.1, S4.2 and S4.3, the above-described optional time-based filter is applied so that the category tag metadata is only generated if the web page was open (or open and visible to the user on the display) for longer than a certain time, labeled to as dwell time in the figure. The category tags and their confidence scores are then determined in Step S4.4 and then saved as part of the log entry for the web page.

Figure 10:
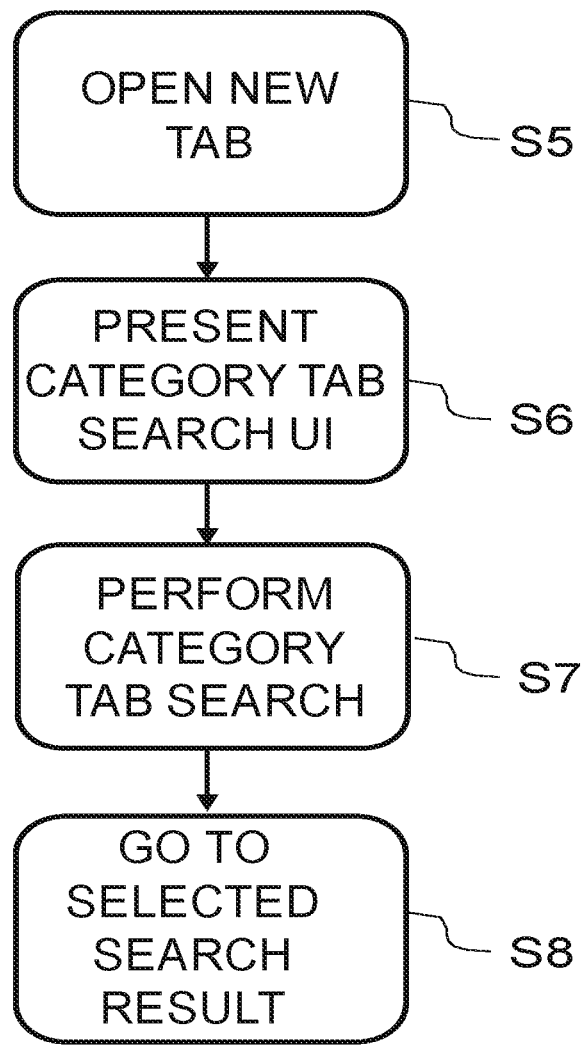
FIG. 10 is a flow diagram showing a method of opening a web page using a category tag search according to embodiments of the disclosure.

FIG. 10 is a flow diagram showing a method of opening a web page using a category-tag-based search. By way of example, this is shown in a workflow that is initiated by the user opening a new browser tab in Step S5. The act of opening a new browser tab presents not only a standard address bar 302, but also a bar 308 to provide a category tag search user interface, as indicated with Step S6. The user then enters terms into the category tag search bar 308 as indicated in Step S7. This triggers a search of the history log based on the category tags entered by the user. A list of log entries filtered by category tags is then presented as search results. On selection of one of the search results by the user, the associated web page is opened in Step S8.

In summary, in the above-described embodiments, the browser history for each page visit would thus typically contain the following standard browser metadata:
  URL
  HTML page title
  optionally the favicon icon (if present)
  date and time stamp
as well as the following metadata:
  category tags associated with that page
  confidence score of each tag for that page visit.
Moreover, further metadata that may also be stored in the browser history include:
  a Boolean or other tag indicating whether the page a bookmarked page
  some measure of page visit/dwell time
  some measure of active page interaction
  some measure of usefulness of a category tag based on its use in the UI to find pages through searching history.

Regarding the category tags contained in the history entry for any given page may come from a variety of sources including: by having been extracted from the page itself by the web analyzer; by propagation from another page; by having been manually added by the user; in case of a bookmarked page the bookmark name and/or the bookmark folder name including the name of any superordinate folders in a bookmark folder hierarchy.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 11:
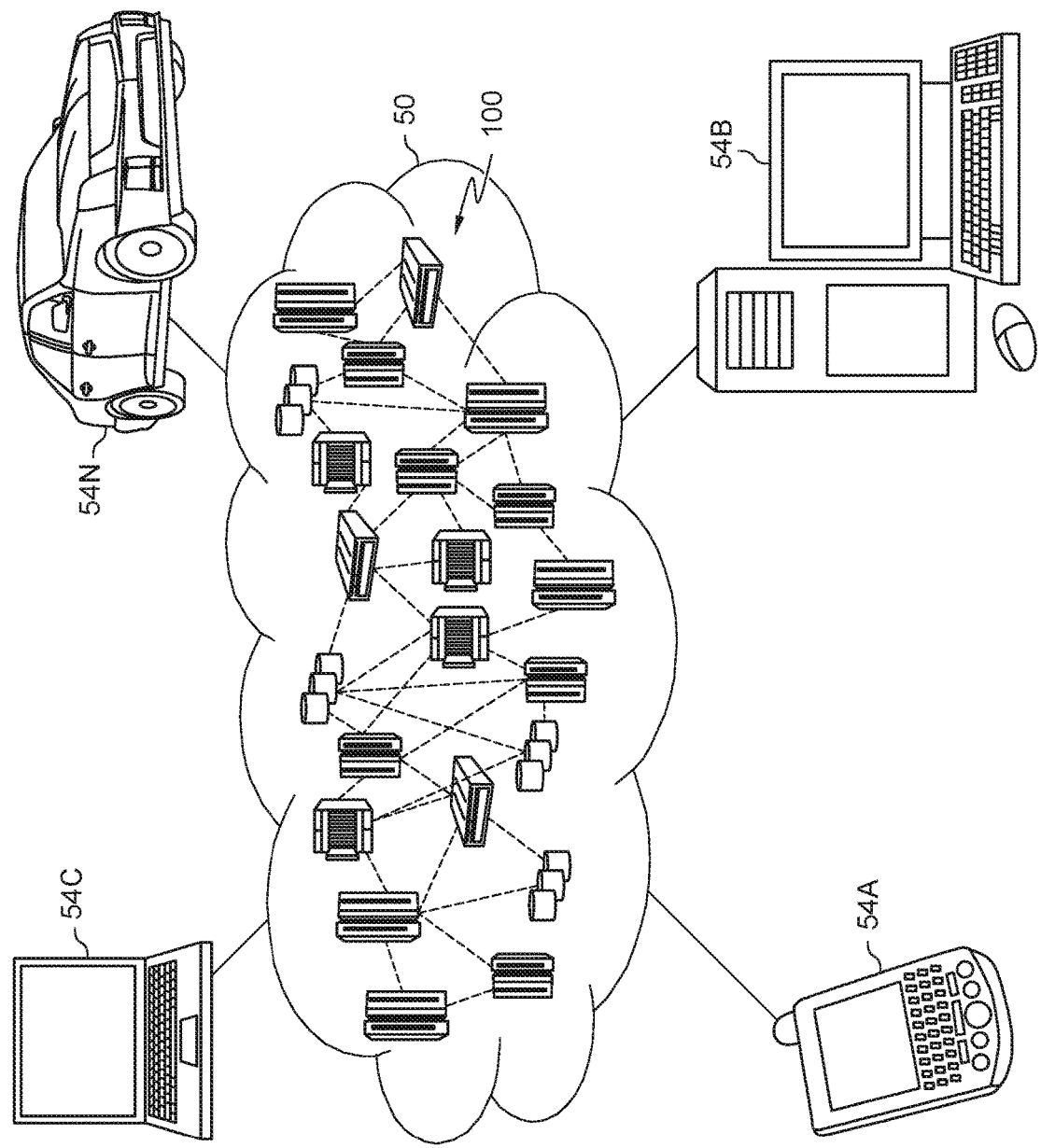
FIG. 11 illustrates a cloud computing environment in which embodiments of the disclosure may be implemented.

Referring now to FIG. 11, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

An add-on according to embodiments of the disclosure may be installed in a web browser in the environment of FIG. 11 as follows. One of the cloud computing nodes 10 may host a website from which the add-on may on request be downloaded to a third party computing device such as any of the computing devices 54A, 54B and 54C. The request causes the add-on to be sent from the node 10 via a network connection to the computing device 54A/54B/54C, where the add-on is sent together with an installer for integrating the add-on with a web browser already present on the computing device.

Figure 12:
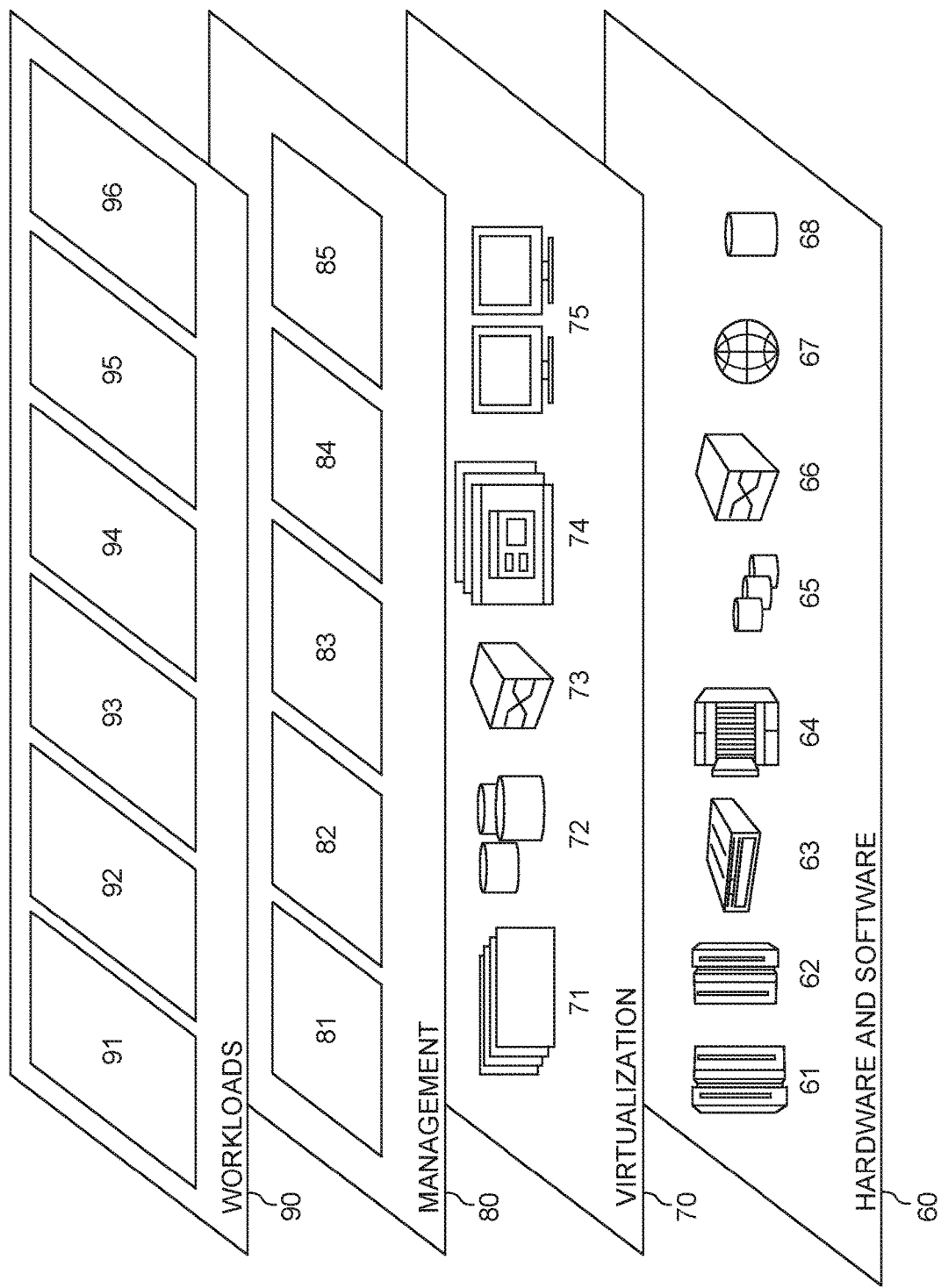
FIG. 12 shows a set of functional abstraction layers provided by the cloud computing environment of FIG. 11.

Referring now to FIG. 12, a set of functional abstraction layers provided by cloud computing environment 50 (FIG. 11) is shown. It should be understood in advance that the components, layers, and functions shown in FIG. 12 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software lifecycle management 92; virtual classroom education delivery 93; data analytics processing 94; transaction processing 95; and a web browser process 96 according to embodiments of the disclosure.

It will be clear to one skilled in the art that many improvements and modifications can be made to the foregoing exemplary embodiment without departing from the scope of the present disclosure.

What is claimed is:

1. A method of operating a browsing session with a web browser, the web browser being operable to present web pages to a user and to navigate between web pages by following hyperlinks, the method comprising:
    analyzing a visited web page to identify text terms of significance for the visited web page and selecting candidate category tags for the visited web page, the candidate category tags comprise the identified text terms of significance, and
    selecting additional candidate category tags for the visited web page based on a linked web page, in response to the visited web page being opened via a hyperlink from the linked web page;
    determining a confidence score for each of the candidate category tags and for each of the additional candidate category tags by applying a scoring formula, the scoring formula being configured to mimic a user's mental association between a category tag and the visited web page and are also based on a number of occurrences of the identified text terms associated with each respective category tag and also based on a semantic position of the identified text terms within the visited web page associated with each candidate category tag and with each additional candidate category tag;

augmenting a confidence score for each of the candidate category tags and for each of the additional candidate category tags for a web page found in a search history of the web browser;

adding a special metadata parameter value for logging each of the candidate category tags and for each of the additional candidate category tags for a web page retrieved from a category tag search, wherein the special metadata parameter value is specific to a category tag and forms a measure of a value of a category tag dependent on a retrieval frequency number and a dwell time per visit of the associated web page;

selecting a set of category tags from the candidate category tags and the additional candidate category tags based on a respective confidence score exceeding a confidence score threshold; and writing a log entry for the visited web page to a history log, each log entry comprising metadata comprising: a URL of the visited web page, a HTML, page title of the visited web page, a date and time stamp, the selected set of category tags, and the confidence score for each category tag of the set of category tags.

2. The method according to claim 1, wherein the web browser is configured to support browsing sessions with multiple simultaneously open browsing tabs, and wherein the candidate category tags further comprises category tags from web pages of other open tabs.

3. The method according to claim 1, wherein the scoring formula has a factor for candidate category tags that originate from other web pages based on a similarity between the visited web page and the other web page.

4. The method according to claim 3, wherein a similarity factor between the visited web page and the other web page is based on the category tags of the other web page are identified as text terms of significance.

5. The method according to claim 1, wherein the web browser is configured to support bookmarks in which the user is able to store the URLs of web pages selected by the user in a folder structure with a page name, wherein each folder has a folder name that is definable by the user, a page name of the currently visited web page and a folder name of the currently visited web page are each a candidate category tag.

6. The method according to claim 1, wherein additional metadata further comprises an indicator of whether the currently visited web page is bookmarked.

7. The method according to claim 1, further comprising: allowing the user to manually edit the history log and add a user defined category tag to a given web page's history log entry.

8. The method according to claim 1, further comprising: allowing the user to manually edit the history log and identify a category tag of a given web page's history as not being representative of the user's mental association with the currently visited web page.

9. The method according to claim 1, wherein inclusion of a category tag of another web page in the candidate category tags is conditional on obtaining user input to confirm that the user associates the candidate category tag from the other web page with the currently visited web page.

10. The method according to claim 6, further comprising: amending the history log responsive to user interaction with the web browser.

11. The method according to claim 10, further comprising:

as a history entry is used to access a web page via use of that category tag in a search by the user, the metadata is amended responsive to analysis of use of category tags in searches made by the user such that the confidence score of a category tag of the history.

12. The method according to claim 10, wherein the additional metadata further comprises a category tag specific relevance parameter whose value is set responsive to a history entry being used to access a web page via use of that category tag in the user interface.

13. The method according to claim 1, further comprising: storing additional metadata conditional on the currently visited web page being visited for an amount of time greater than a threshold value.

14. The method according to claim 1, further comprising: providing a website from which an add-on may be downloaded to a third party computing device on request; and causing the add-on to be sent via a network connection to the third party computing device in response to such a request together with an installer for integrating the add-on with a web browser installed on the computing device.

15. The method according to claim 1, further comprising: searching the history log based on category tags entered by the user via a user interface in order to present a filtered selection of log entries as search results; and opening a web page chosen from the search results via the user interface.

16. A computer system for operating a browsing session with a web browser, the web browser being operable to present web pages to a user and to navigate between web pages by following hyperlinks, the computer system comprising:

one or more computer processors, one or more computer-readable storage media, and program instructions stored on the one or more of the computer-readable storage media for execution by at least one of the one or more processors, wherein the computer system is capable of performing a method comprising:

analyzing a visited web page to identify text terms of significance for the visited web page and selecting candidate category tags for the visited web page, the candidate category tags comprise the identified text terms of significance, and selecting additional candidate category tags for the visited web page based on a linked web page, in response to the visited web page being opened via a hyperlink from the linked web page;

determining a confidence score for each of the candidate category tags and for each of the additional candidate category tags by applying a scoring formula, the scoring formula being configured to mimic a user's mental association between a category tag and the visited web page and are also based on a number of occurrences of the identified text terms associated with each respective category tag and also based on a semantic position of the identified text terms within the visited web page associated with each candidate category tag and with each additional candidate category tag;

augmenting a confidence score for each of the candidate category tags and for each of the additional candidate category tags for a web page found in a search history of the web browser;

adding a special metadata parameter value for logging each of the candidate category tags and for each of the additional candidate category tags for a web page retrieved from a category tag search, wherein the special metadata parameter value is specific to a category tag and forms a measure of a value of a category tag dependent on a retrieval frequency number and a dwell time per visit of the associated web page;

selecting a set of category tags from the candidate category tags and the additional candidate category tags based on a respective confidence score exceeding a confidence score threshold; and writing a log entry for the visited web page to a history log, each log entry comprising metadata comprising: a URL of the visited web page, a HTML, page title of the visited web page, a date and time stamp, the selected set of category tags, and the confidence score for each category tag of the set of category tags.

17. The computer system according to claim 16, further comprising:

allowing the user to manually edit the history log and add a user defined category tag to a given web page's history log entry;

allowing the user to manually edit the history log and identify a category tag of a given web page's history as not being representative of the user's mental association with that web page;

inclusion of a category tag from another web page in the set of candidate category tags is conditional on obtaining user input to confirm that the user associates the category tag from the other web page with the currently visited web page;

amending additional metadata stored in the history log responsive to the user's interaction with the web browser, additional metadata is amended responsive to analysis of the user's use of category tags in searches made by the user interface such that the confidence score of a category tag in a history entry is increased when that history entry is used to access a web page via use of that category tag in a search by the user interface;

additional metadata further comprises a category tag specific relevance parameter whose value is set responsive to a history entry being used to access a web page via use of that category tag in the user interface; and storing additional metadata conditional on the currently visited web page being visited for an amount of time greater than a threshold value.

18. The computer system according to claim 16, further comprising:

providing a website which may be downloaded to a third party computing device on request; and causing an add-on to be sent via a network connection to the third party computing device in response to such a request together with an installer for integrating the add-on with a web browser installed on the computing device.

19. A computer program product for operating a browsing session with a web browser, the web browser being operable to present web pages to a user and to navigate between web pages by following hyperlinks, the computer program product comprising:

one or more computer-readable storage media and program instructions stored on the one or more computer-readable storage media, the program instructions executable by a computing system to cause the computing system to perform a method comprising:

analyzing a visited web page to identify text terms of significance for the visited web page and selecting candidate category tags for the visited web page, the candidate category tags comprise the identified text terms of significance, and selecting additional candidate category tags for the visited web page based on a linked web page, in response to the visited web page being opened via a hyperlink from the linked web page;

determining a confidence score for each of the candidate category tags and for each of the additional candidate category tags by applying a scoring formula, the scoring formula being configured to mimic a user's mental association between a category tag and the visited web page and are also based on a number of occurrences of the identified text terms associated with each respective category tag and also based on a semantic position of the identified text terms within the visited web page associated with each candidate category tag and with each additional candidate category tag;

augmenting a confidence score for each of the candidate category tags and for each of the additional candidate category tags for a web page found in a search history of the web browser;

adding a special metadata parameter value for logging each of the candidate category tags and for each of the additional candidate category tags for a web page retrieved from a category tag search, wherein the special metadata parameter value is specific to a category tag and forms a measure of a value of a category tag dependent on a retrieval frequency number and a dwell time per visit of the associated web page;

selecting a set of category tags from the candidate category tags and the additional candidate category tags based on a respective confidence score exceeding a confidence score threshold; and writing a log entry for the visited web page to a history log, each log entry comprising metadata comprising: a URL of the visited web page, a HTML, page title of the visited web page, a date and time stamp, the selected set of category tags, and the confidence score for each category tag of the set of category tags.

20. The computer program product according to claim 19, further comprising:

allowing the user to manually edit the history log and add a user defined category tag to a given web page's history log entry;

allowing the user to manually edit the history log and identify a category tag of a given web page's history as not being representative of the user's mental association with the currently visited web page;

inclusion of a category tag from another web page is conditional on obtaining user input to confirm that the user associates the category tag from the other web page with the currently visited web page;

amending additional metadata stored in the history log responsive to the user's interaction with the web browser, additional metadata is amended responsive to analysis of the user's use of category tags in searches made by the user such that the confidence score of a category tag in a history entry is increased when that history entry is used to access a web page via use of the category tag in a search by the user interface, additional metadata further comprises a category tag specific relevance parameter whose value is set responsive to a history entry being used to access a web page via use of that category tag in the user interface; and storing additional metadata conditional on the currently visited web page being visited for an amount of time greater than a threshold value.

\* \* \* \* \*